(12) United States Patent
Roelofs et al.

(10) Patent No.: US 9,885,861 B2
(45) Date of Patent: Feb. 6, 2018

(54) CHARGE GRADIENT MICROSCOPY

(71) Applicant: UCHICAGO ARGONNE, LLC., Chicago, IL (US)

(72) Inventors: Andreas Roelofs, Wheaton, IL (US); Seungbum Hong, Darien, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 448 days.

(21) Appl. No.: 14/258,965

(22) Filed: Apr. 22, 2014

(65) Prior Publication Data
US 2015/0301324 A1  Oct. 22, 2015

(51) Int. Cl.
| | | |
|---|---|---|
| H04N 7/18 | (2006.01) | |
| G02B 21/36 | (2006.01) | |
| G02B 21/00 | (2006.01) | |
| G01Q 60/30 | (2010.01) | |

(52) U.S. Cl.
CPC ........... *G02B 21/361* (2013.01); *G01Q 60/30* (2013.01); *G02B 21/002* (2013.01)

(58) Field of Classification Search
CPC .................................................. G02B 21/361
See application file for complete search history.

(56) References Cited

U.S. PATENT DOCUMENTS

| | | | | |
|---|---|---|---|---|
| 6,002,131 A * | 12/1999 | Manalis | ................. | G01Q 60/60 324/458 |
| 7,813,254 B2 | 10/2010 | Siegert et al. | | |
| 8,264,941 B2 | 9/2012 | Tran et al. | | |
| 2003/0234358 A1 | 12/2003 | Higgins et al. | | |
| 2007/0258147 A1* | 11/2007 | Van Der Boom | ... | H01G 9/2059 359/599 |
| 2008/0192528 A1 | 8/2008 | Siegert et al. | | |
| 2013/0002527 A1* | 1/2013 | Kim | ...................... | H01L 29/786 345/82 |
| 2013/0003521 A1 | 1/2013 | Tran et al. | | |
| 2013/0278937 A1* | 10/2013 | Degertekin | ............ | B82Y 35/00 356/501 |

OTHER PUBLICATIONS

"FRAM: Ferroelectric RAM," Fujitsu Semiconductor Limited, Feb. 2013, 8 pages.
Balke, et al., "Deterministic control of ferroelastic switching in multiferroic materials," Nature Nanotechnology, Oct. 2009, vol. 4, pp. 868-875.

(Continued)

*Primary Examiner* — Tracy Y Li
(74) *Attorney, Agent, or Firm* — Foley & Lardner LLP

(57) ABSTRACT

A method for rapid imaging of a material specimen includes positioning a tip to contact the material specimen, and applying a force to a surface of the material specimen via the tip. In addition, the method includes moving the tip across the surface of the material specimen while removing electrical charge therefrom, generating a signal produced by contact between the tip and the surface, and detecting, based on the data, the removed electrical charge induced through the tip during movement of the tip across the surface. The method further includes measuring the detected electrical charge.

14 Claims, 11 Drawing Sheets
(11 of 11 Drawing Sheet(s) Filed in Color)

(56) References Cited

OTHER PUBLICATIONS

Cho, et al., "Electrochemistry of Conductive Polymers 39. Contacts between Conducting Polymers and Noble Metal Nanoparticles Studied by Current-Sensing Atomic Force Microscopy," Journal of Physical Chemistry B, 2006, vol. 110, No. 51, pp. 25656-25664.
Crassous, et al., "Nanoscale Electrostatic Manipulation of Magnetic Flux Quanta in Ferroelectric/Superconductor $BiFeO_3/YBa_2Cu_3O_{7-\delta}$ Heterostructures," Physical Review Letters, Dec. 2011, vol. 107, No. 247002, 5 pages.
Cross, "Lead-free at last," Nature, Nov. 2004, vol. 432, pp. 24-25.
Gopalan, et al., "The role of nonstoichiometry in 180° domain switching of $LiNbO_3$ crystals," Applied Physics Letters, Apr. 1998, vol. 72, No. 16, pp. 1981-1983.
Hong, et al., "Principle of ferroelectric domain imaging using atomic force microscope," Journal of Applied Physics, Jan. 2001, vol. 89, No. 2, pp. 1377-1386.
Hruszkewycz, et al., "Imaging Local Polarization in Ferroelectric Thing Films by Coherent X-Ray Bragg Projection Ptychography," Physical Review Letters, Apr. 2013, vol. 110, No. 177601, 2013, 5 pages.
Huang, et al., "Optical Coherence Tomography," Science, Nov. 1991, vol. 254, pp. 1178-1181.
Ievlev, et al., "Intermittency, quasiperiodicity and chaos in probe-induced ferroelectric domain switching," Nature Physics, Nov. 2013, vol. 10, 2014, pp. 59-66.
Jang, et al., "Ferroelectricity in Strain-Free $SrTiO_3$ Thing Films," Physical Review Letters, May 2010, vol. 104, No. 197601, 4 pages.
Kalinin, et al., "Local polarization dynamics in ferroelectric materials," Reports on Progress in Physics, 2010, vol. 73, No. 056502, 67 pages.
Kim, et al., "Origin of surface potential change during ferroelectric switching in epitaxial $PbTiO_3$ thin films studied by scanning force microscopy," Applied Physics Letters, 2009, vol. 94, No. 032907, 3 pages.
Kim, et al., "Screen charge transfer by grounded tip on ferroelectric surfaces," Physica Status Solidi RRL, Jan. 2008, vol. 2, No. 2, pp. 74-76.
Ko, et al., "High-Resolution Field Effect Sensing of Ferroelectric Charges," Nano Letters, Mar. 2011, vol. 11, pp. 1428-1433.
McQuaid, et al., "Mesoscale flux-closure domain formation in single-crystal $BaTiO_3$," Nature Communications, Jul. 2011, vol. 2, No. 404, pp. 1-6.
Nath, et al., "High speed piezoresponse force microscopy: <1 frame per second nanoscale imaging," Applied Physics Letters, 2008, vol. 93, No. 072905, 3 pages.
Ng, et al., "Scalable printed electronics: an organic decoder addressing ferroelectric non-volatile memory," Scientific Reports, Aug. 2012, vol. 2, No. 585, pp. 1-7.
Park, et al., "Visualization and manipulation of meta-stable polarization variants in multiferroic materials," AIP Advances, 2013, vol. 3, No. 042114, 6 pages.
Pauzauskie, et al., "Optical trapping and integration of semiconductor nanowire assemblies in water," Nature Materials, Jan. 2006, vol. 5, pp. 97-101.
Purcell, et al., "A force-dependent state controls the coordination of processive myosin V," PNAS, Sep. 2005, vol. 102, No. 39, pp. 13873-13878.
Roelofs, et al., "Differentiating 180° and 90° switching of ferroelectric domains with three-dimensional piezoresponse force microscopy," Applied Physics Letters, Nov. 2000 vol. 77, No. 21, pp. 3444-3446.
Seidel, et al., "Domain Wall Conductivity in La-Doped $BiFeO_3$," Physical Review Letters, Nov. 2010, vol. 105, No. 197603, 3 pages.
Smith & Welsh, "Temperature Dependence of the Elastic, Piezoelectric, and Dielectric Constants of Lithium Tantalate and Lithium Niobate," Journal of Applied Physics, May 1971, vol. 42, No. 6, pp. 2219-2230.
Soergel, "Piezoresponse force microscopy (PFM)," Journal of Physics D: Applied Physics, Nov. 2011, vol. 44, No. 464003, 17 pages.
Zeches, et al., "A Strain-Driven Morphotropic Phase Boundary in $BiFeO_3$," Science, Nov. 2009, vol. 326, 2009, pp. 977-980.

\* cited by examiner (a) PFM phase (c) CGM (b) EFM amplitude (d) EFM amplitude

EFM phase

EFM phase (e) PFM phase (a)

(b)

CHARGE GRADIENT MICROSCOPY

This invention was made with government support under Contract Department of Energy, Office of Science, Office of Basic Energy Sciences, under Contract No. DE-AC02-06CH11357. The U.S. Government has certain rights in the invention.

FIELD OF THE INVENTION

The present invention relates generally to the field of scanning probe microscopy (SPM). More particularly, the present invention relates to methods and devices involving bound charges to produce reliable imaging of ferroelectric and piezoelectric domain walls or trapped charges in thin films and bulk crystals.

BACKGROUND

Ferroelectric and piezoelectric materials have garnered considerable interest due to their numerous applications in diverse commercial markets, e.g., medical imaging devices, next generation inkjet printer heads, precision positioning stages for microscopes, fuel injectors in diesel engines and memory devices. The macroscopic properties of ferroelectric and piezoelectric materials that make them attractive for such technologies can be more fully understood and improved through detailed knowledge of their domain structures at the nanoscale and mesoscale levels.

Scanning probe microscopes (SPMs) have been employed for studying ferroelectric and piezoelectric materials. To aid in understanding the structures of these materials, one well-established microscopy technique that has been applied extensively to ferroelectric materials is Piezoresponse Force Microscopy (PFM), a scanning probe technique that enables the visualization and manipulation of ferroelectric domain structures at the nanoscale. In PFM, a voltage is applied to the material and the inverse piezoelectric effect is employed to detect a motion of the sample surface. More particularly, PFM uses an external AC voltage to modulate the strain induced by the inverse piezoelectric effect while monitoring a resulting deformation wave in terms of both amplitude and phase.

PFM requires a lock-in amplifier, which enhances the inherently small vibration signal of the sample. The lock-in amplifier is needed to detect the signal due to the small surface deformations in the material. However, one of the major drawbacks of PFM is that the speed of data acquisition is limited by the resonance frequency of the cantilever of the PFM test apparatus and the time constant of the lock-in amplifier. PFM images are seldom acquired at scan frequencies higher than 10 Hz over a scan length of 10 µm. To acquire images at relatively higher frequencies, advanced lock-in equipment and specialized, expensive hardware are needed (see e.g., US 2008/0192528 to Siegert et al.). The scan speed limitations of PFM due to the resonance frequencies of the cantilever and the time constant of the lock-in amplifier restrict the application of PFM to investigate dynamic properties of piezoelectric and ferroelectric materials, and hinder the efficiency of PFM techniques. Further, the excitation voltage necessary for PFM has the potential to influence dynamic behavior in ferroelectric films.

SUMMARY OF THE INVENTION

Embodiments of the present invention provide devices and methods for high-speed imaging of ferroelectric and piezoelectric domains at the nanoscale. Such devices and methods allow for imaging to be carried out that is at least one or two orders of magnitude faster than conventional techniques. The embodiments of the present invention can realize more efficient approaches by accumulating charges at locations scraped by an Atomic Force Microscopy (AFM) tip or the electric polarization beneath the sample surface and by mapping them as a function of position.

In such embodiments, polarization charges of ferroelectric materials are screened by an equal amount of surface charges with opposite polarities in ambient sources. Thus, scraping, collecting and quantifying the surface screen charges of a material specimen may reveal the underlying polarization domain structure at a much high speed. The scraped charge, measured as a current that scales with a scraping rate, induces a charge gradient which leads to an immediate relocation or a refill of the screen charges from the vicinity of the electrode tip. Thus, certain methods according to various embodiments allow for a reliable tool to study the complex dynamics of domain nucleation and growth induced by a biased tip in the absence of surface screen charges. By achieving much faster imaging times, at least some embodiments avoid the shortcomings associated with conventional PFM approaches.

In at least some embodiments, current flow is collected from a grounded electrode tip while scanning a periodically poled lithium niobate (PPLN) single crystal and single crystal $LiTaO_3$ thin film on Cr electrodes. In such samples, a strong current signal at the domain walls originates from the displacement current and the relocation of bound surface charges, which enables visualization of the domains at scan frequency above 78 Hz with a spatial resolution of about 200 nm. The signal is affected by various factors including polarization charges, screening charges, and their removal and replenishment, as will be discussed below.

In addition to rapid scanning, at least some embodiments do not require a lock-in amplifier. By virtue of obviating the need for such a device, these embodiments permit domain imaging with any standard scanning probe microscope that incorporates a current amplifier. Thus, such embodiments may be readily incorporated into high-speed ferroelectric and ionic domain imaging devices and novel piezoelectric energy harvesting devices.

Certain embodiments of the present invention encompass devices that are designed to implement the methods according to the invention described below.

Additional features, advantages, and embodiments of the present disclosure may be set forth from consideration of the following detailed description, figures, and claims. Moreover, it is to be understood that both the foregoing summary of the present disclosure and the following detailed description are exemplary and intended to provide further explanation without further limiting the scope of the present disclosure claimed.

BRIEF DESCRIPTION OF THE FIGURES

The patent or application file contains at least one drawing executed in color. Copies of this patent or patent application publication with color drawing(s) will be provided by the Office upon request and payment of necessary fees.

The accompanying figures, which are included to provide further understanding of the invention, are incorporated in and constitute a part of this specification, illustrate the advantageous results produced by embodiments of the present disclosure and, together with the detailed description, serve to explain the principles of the present disclosure. No attempt is made to show details of the present disclosure to a greater extent than may be necessary for a fundamental understanding of the present disclosure and the various ways in which it may be practiced.

DETAILED DESCRIPTION OF PREFERRED EMBODIMENTS

In the following detailed description, reference is made to the accompanying figures, which form a part hereof. In the figures, similar symbols typically identify similar elements, unless context dictates otherwise. The illustrative embodiments described in the detailed description, figures, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be performed, arranged, substituted, combined, and designed in a wide variety of different configurations, all of which are explicitly contemplated and made part of this disclosure.

Figure 1:
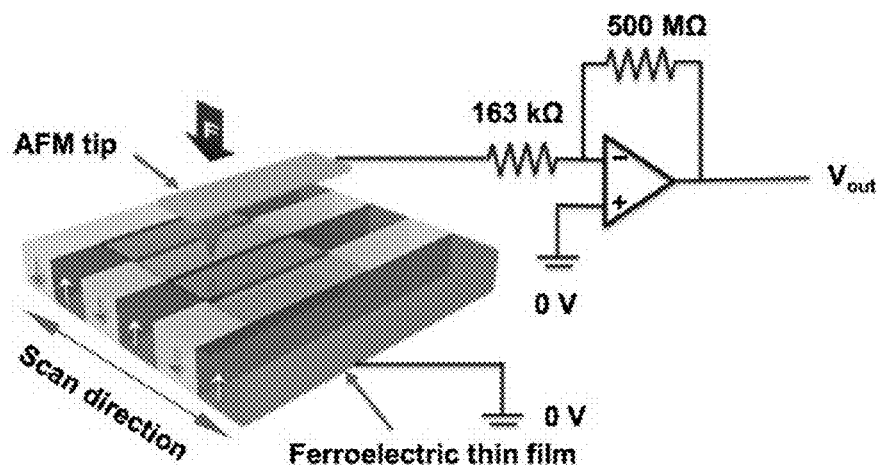
FIG. 1 illustrates a schematic diagram of a device according to an embodiment.

Referring now to FIG. 1, a schematic diagram of microscopy according to an embodiment is depicted. In the embodiment shown in FIG. 1, polarization charges are characterized at high speed by scraping screen charges on a surface of a ferroelectric thin film using a conducting AFM tip. As indicated by FIG. 1, a constant force (F) is applied to the AFM tip. Current is then collected through an amplifier as the tip is scanned across the domain boundaries in a ferroelectric or piezoelectric material. The measured current may be affected by various factors and may be said to have contributions from, among other things, displacement currents when crossing over domain boundaries, piezoelectric charge flow, and current due to removal of bound screening charges.

The embodiment shown in FIG. 1 does not require a lock-in amplifier, unlike conventional PFM. Thus, the embodiment of FIG. 1, and certain other embodiments, can employ higher scan frequencies to obtain domain images. The embodiment shown in FIG. 1 also differs from techniques such as conducting AFM (C-AFM) and current sensing AFM (CS-AFM) inasmuch as no external bias is applied while collecting the current. At least some embodiments, including that shown in FIG. 1, also differ from C-AFM and CS-AFM because such embodiments require removal of surface screening charges by the tip.

Figure 2:
FIGS. 2(a)-(e) illustrate Charge Gradient Microscopy (CGM) measurements in which screening charges are removed without altering polarization charges in a material.
Figure 2:
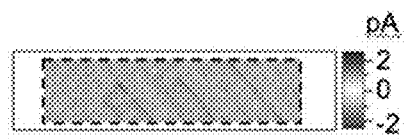
Figure 2:
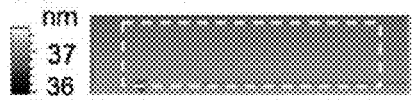
Figure 2:
Figure 2:
Figure 2:
Figure 2:

FIG. 2 depicts (a) imaging according to PFM phase and (b) EFM amplitude and phase images before imaging according to the CGM techniques of the present invention was carried out within the region demarcated by the white dotted box. FIG. 2 further depicts (c) imaging according to the present invention within the white dotted box, (d) EFM amplitude and phase images after imaging according to the present invention within the demarcated region, and (e) PFM phase images following imaging according to the present invention.

In at least some embodiments, the tip scrapes the screen charges on the surface, as indicated in FIG. 2(c). Scraping was seen in experiments in which PFM and electrostatic force microscopy (EFM) imaging were carried out on a PPLN sample before conducting microscopy according to an embodiment on a region of a sample indicated by the white dotted box shown in FIG. 2. As the surface is fully screened, no significant EFM contrasts are visible, whereas up-and-down domains are visible via PFM, as PFM measures the inverse piezoelectric effect of the sample. The sensitivity of PFM phase images to polarization charges is seen by comparing FIG. 2(a) to 2(e). The sensitivity of PFM is attributable at least in part to the sign of the piezoelectric coefficient being the same as that of the polarization vector, whereas EFM amplitude and phase are sensitive to the net polarization and screen charges.

Moreover, after conducting imaging in accordance with embodiments of the present invention, the EFM contrast yielded dark and bright stripes on the demarcated region, revealing unscreened polarization charges. In contrast, the PFM phase contrast was not affected by imaging in accordance with such embodiments. Thus, the embodiments entail scraping the screen charges without affecting polarization charges. Furthermore, in such embodiments, the contrast does not change across repeatable scans, while the peaks at the domain walls change their polarity at opposite scan directions. Additionally, the current polarity over domain centers does not change. Accordingly, additional experimentation involving certain embodiments addressed external and internal screening, as well as refill of external screen charges. With respect to the latter, neighboring screen charges, ambient sources, and grounded tips were considered.

At least some embodiments allow for calibration of conducting AFM (C-AFM) to check the nature of contact (e.g., Ohmic or Schottky), contact resistance, and offset in both voltage and current measurements using highly ordered pyrolytic graphite (HOPG) standard samples. After the calibration, imaging was performed using grounded platinum (Pt) wire AFM tips (RMN 25Pt300B, 18 N/m, produced by Rocky Mountain Nanotechnology, LLC) on periodically poled lithium niobate (PPLN) samples (AR-PPLN Test Samples, obtained from Asylum Research, Inc. Each sample consisted of a 3 mm×3 mm LiNbO$_3$ transparent die of 0.5 mm thickness. Samples of other materials, including congruent lithium tantalate (CLT) thin films, were also the subject of certain experiments and are described below. The current was collected through the tip attached to a cantilever holder (ORCA, gain of 5×10$^8$ volts/amp (≈1 pA to 20 nA), obtained from Asylum Research, Inc.) while the bottom electrode was grounded. In order to ensure grounding of the tip, the offset voltage of about −83 mV was removed, as well as the offset current of about 50 pA.

As will be described below with reference to specific images taken according to various embodiments, the scan frequency was varied from 5 Hz to 30 Hz and the scan size was 25 μm×25 μm. The applied force to the tip was 1.17 μN. The scan angle was fixed at 45°, while the images were of a pixel resolution of 256×256. To obtain line profiles across the domain boundaries, an arbitrary line perpendicular to the domain wall was chosen. In order to enhance the signal to noise ratio, approximately 20 lines adjacent to the arbitrarily chosen line were used to obtain the averaged line profile. However, such embodiments may be implemented using various scan frequencies, sample sizes, image resolutions, and line profiling approaches.

Figure 3:
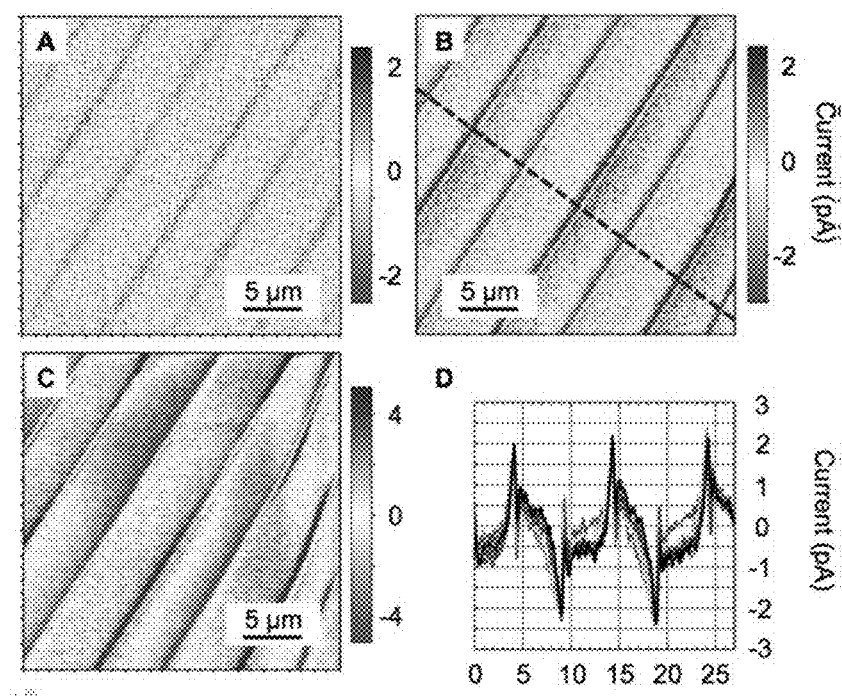
FIGS. 3(a)-(d) illustrate imaging of a crystal with respect to scan frequency, according to an embodiment.

FIG. 3 depicts images obtained in accordance with certain embodiments and having scan frequencies of (a) 5 Hz, (b) 10 Hz, and (c) 20 Hz over an area of 25 μm×25 μm on PPLN single crystals. FIG. 3(d) indicates the repeatability of imaging according to such embodiments, with the number of repetitions for line profiles obtained on the same region (the region indicated by the black dotted lines in (b)) as follows: red corresponds to 1 repetition, orange corresponds to 2 repetitions, yellow corresponds to 3 repetitions, green corresponds to 4 repetitions, blue corresponds to 5 repetitions, red, 2: orange, 3: yellow, 4: green, 5: blue, indigo corresponds to 6 repetitions, violet corresponds to 7 repetitions, and black corresponds to 8 repetitions. The width of each domain is 5 μm.

In such embodiments, the signal is dependent on the scan frequency, and the current increases with the scan speed. Two distinct contributions to the signals were revealed. As for the first contribution, the dominant part of the signals at lower scan frequency originates from the displacement current when the tip crosses the domain boundaries, as reflected in FIG. 4 (described below). The second contribution, which becomes stronger with increased scan frequency, may originate from the direct piezoelectric effect and/or the removal of surface charges. FIG. 3 indicates two peak structures near the domain boundaries. Although not spatially resolved in FIGS. 9 and 12, the shape and polarity of the peaks near four domain boundaries are well suited for being imaged according to this embodiment. Further, the domains can be evaluated so as to validate CGM techniques using PFM. Furthermore, such embodiments reveal that the polarity reverses upon reversal of the scan directions.

The distortion in measurements seen in FIG. 3(c) may be attributable to the mechanical deformation of platinum tips as observed by scanning electron microscopy (SEM). In order to ensure that no significant capacitance change was due to topography, the root mean square roughness of the area of interest was measured. The root mean square roughness was 0.15 nm for the PPLN samples and 0.35 nm for CLT samples (described in more detail below).

Referring once more to FIG. 3, a second contributor to the signal produced in some embodiments may stem from the charge flow from the ground, as mentioned above. This second contributing factor may become more pronounced as the scan frequency increases. In some embodiments, the charge flow from the ground may serve to compensate either an overcharged AFM tip or an unscreened surface when the tip scrapes the surface charges, as respectively indicated in FIGS. 5 and 6 and described below.

Figure 4:
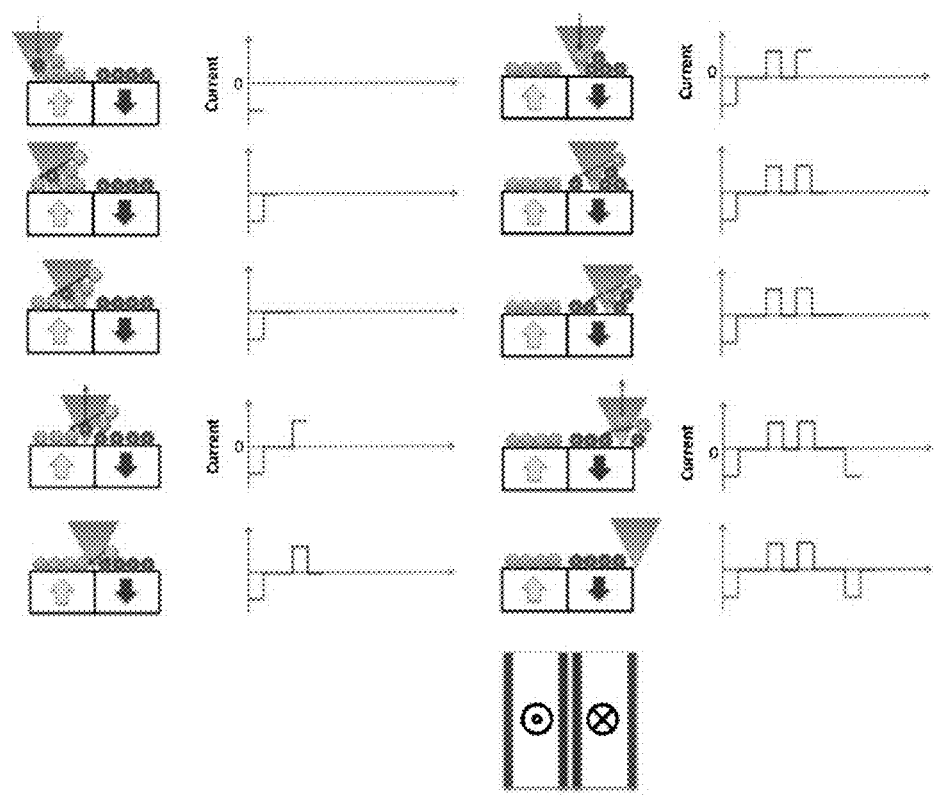
FIG. 4 illustrates carrying out a contrast technique based on the scraping and transferring of the external screening charges, according to an embodiment.

FIG. 4 shows an embodiment involving external screening charges and the scraping of charges at a moving front, with transfer of the scraped charges to the trailing edge of the AFM tip. The screen charges are only supplied by the tip at the vicinity of the domain boundaries, and the flow may have two peaks over the boundaries. The polarity of the peaks may change depending on the scan directions. The peaks may be positive when scanned from positive to negative domains and negative when scanned from negative to positive domains. This component is close to the displacement current induced by the change of polarization at the domain boundaries. That is, the measured current may approximately match the switching current of a ferroelectric capacitor of the same area, which is formed by the AFM-tip and the bottom electrode.

FIG. 4 depicts a schematic diagram of an embodiment involving scraping of external screening charges on the moving front of an AFM tip and transferring the screen charges to the trailing edge of the tip. The charges of the same polarity as the screen charges may flow to the tip only over the domain boundaries so as to form two peaks. The polarity of the peaks may be dependent on the scan directions. Projected top-view images are depicted for the positive and negative domains.

Figure 5:
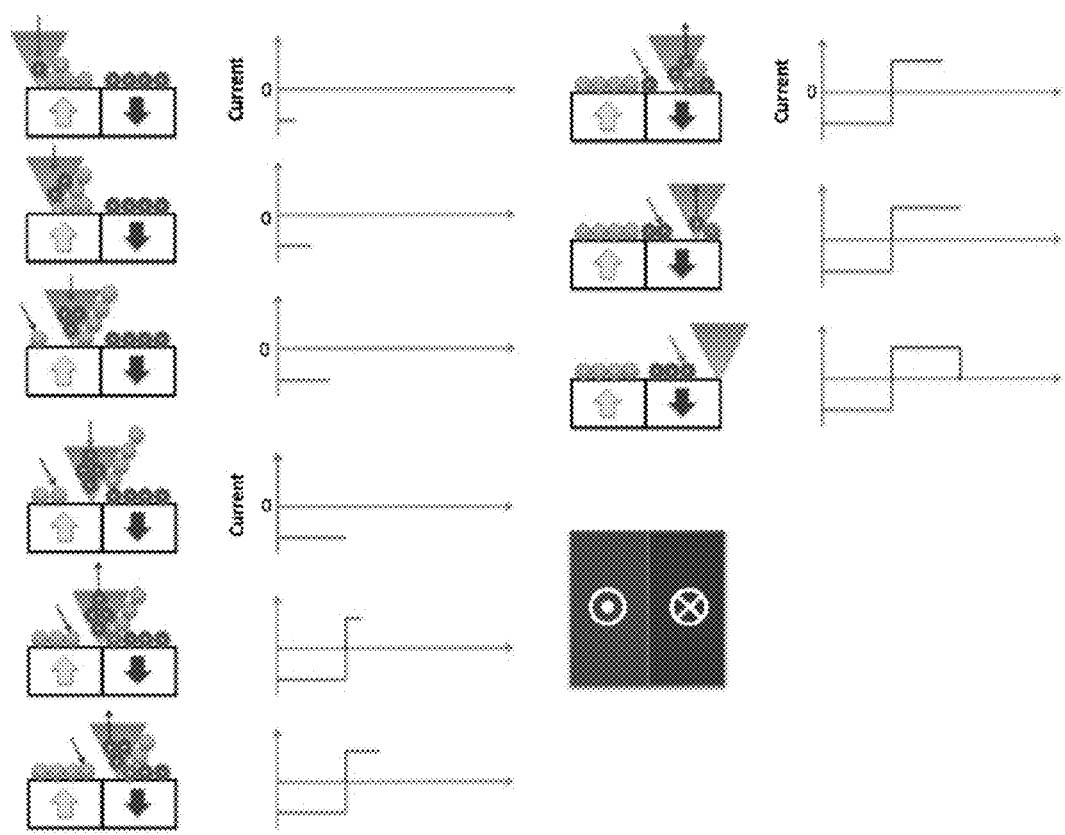
FIG. 5 illustrates carrying out a contrast technique involving the presence of external screening charges and scraping of those charges by moving an electrode tip according to an embodiment.

FIG. 5 indicates external screening charges and scraping of those charges by moving the tip, in accordance with an embodiment. Scraping of the external charges by moving the tip results in the flow of charges of opposite polarity to existing screen charges. The flow of charges of opposite polarity is due to the change of electric potential of the tip. More particularly, FIG. 5 depicts the scraping of the external screening charges on the moving front of the tip and replenishing the screen charges from ambient sources at the trailing edge of the tip with a delay. Recombination of opposite screen charges occurs when they meet in the proximity. Projected top-view images in accordance with this embodiment are depicted for the positive and negative domains.

With reference again to FIG. 5, the embodiment shown therein (among other embodiments) may involve screening of uncompensated polarization charges. More specifically, the trailing edge of the tip will leave uncompensated polarization charges that may be screened by incoming screen charges from the ambient sources. Furthermore, when the tip moves across the domain boundary, the accumulated charges at the moving front of the tip may recombine with the screen charges of opposite polarity. In such circumstances, the current may flow over the domains and its polarity may not be dependent upon the scan directions. In particular, under such conditions, the current may be constantly positive over negative domains, and negative over positive domains. Instances where the current is positive over negative domains and negative over positive domains are depicted in FIG. 3(b), described above, and also in FIGS. 9(a)-(b), to be described in more detail below.

Figure 6:
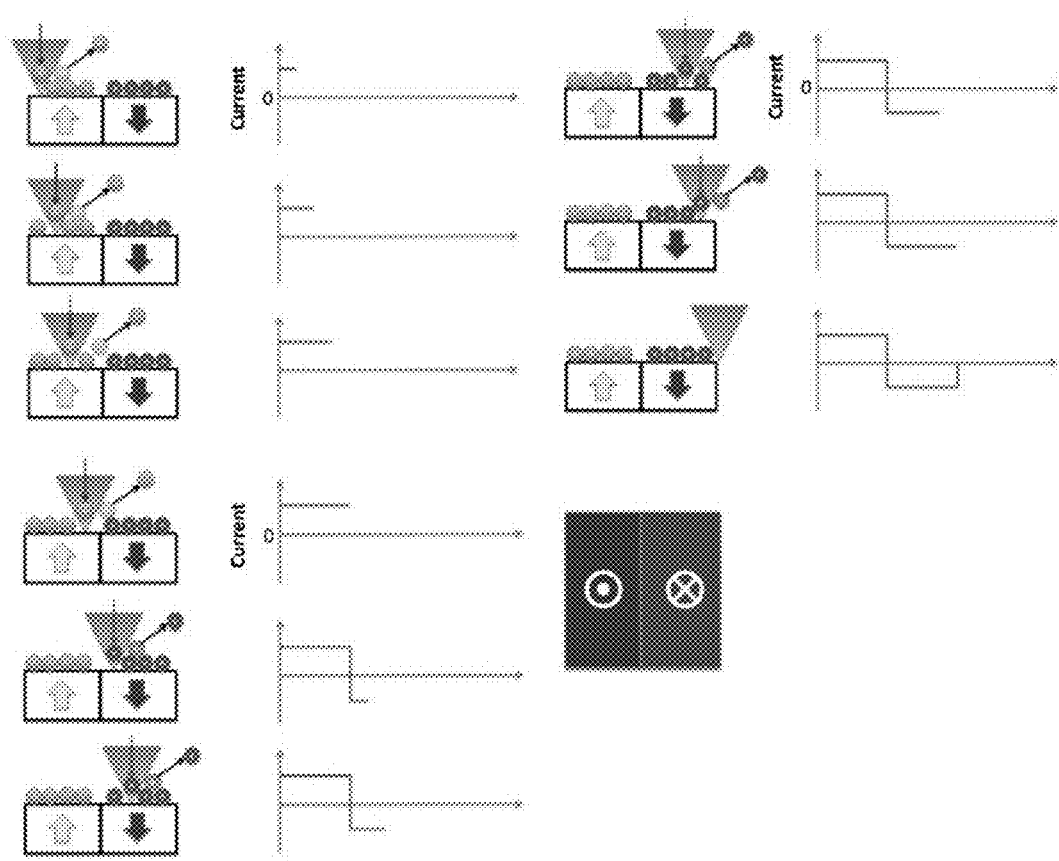
FIG. 6 illustrates carrying out a contrast technique based on the removal of external screening charges and replenishing of the same, according to an embodiment.

FIG. 6 depicts a schematic diagram of an embodiment accounting for external screening charges and removing such screening charges at a moving front. The screening charges may be removed due to the mechanical impact transferred to them. In some embodiments, removal may also be attributable to repulsive force from other screen charges in the vicinity of the screening charges to be removed. Under some conditions, screen charges of the same polarity may be supplied from the grounded tip and deposited on the surface. As such, the current polarity flowing to the tip is positive for positive domains and negative for negative domains, irrespective of scan directions, as indicated in FIGS. 3(a) and 3(c).

At least some embodiments allow for calculation of the aggregated charge collected for a given profile. For example, by integrating the current over the line profile shown in FIG. 3(d) at a scan frequency of 10 Hz, a collected charge may be calculated to be 45.4±3.3 fC. An expected displacement charge associated with crossing over a single domain may be calculated based on certain assumptions, e.g., the assumption of a hemispherical tip contact with a radius of 45 nm, a remnant polarization ($P_r$) of 80 μC/cm2, and an absence of screen charges by surface charge removal. The estimated surface charge created by the sample remnant polarization of 80 μC/cm$^2$ over an area of hemisphere with a radius of 45 nm is 5.05 fC ($Q=\sigma A=(P_r \ddot{Y}n)A$, where σ is surface charge density, A is the area of contact and n is the unit surface normal vector of A). As the change of polarization across the domain boundary is $2P_r$, the expected amount of charge flowing to the tip is 10.1 fC. This leads to the estimated charge of 50.5 fC for five domain walls. The assumption of no screen charge is supported inasmuch as at least 1 μN (≈120 MPa) needed to be applied, which effectively removed the surface screen charge and EFM images collected before and after the aforementioned experiments on the PPLN sample (see FIG. 2).

At least some embodiments allow for calculation of the expected charge from the direct piezoelectric effect, which may be 0.007-0.019 fC under a load of 1.17 μN for single crystal Z-cut lithium niobate with a piezoelectric coefficient, d33, of 6-16 pC/N. The calculation of 45.4 fC in such experiments, in comparison to the calculation of an unscreened displacement charge of 50.5 fC and the calculation of a piezoelectric charge of 0.019 fC, demonstrates that the measured signal is dominated by the unscreened displacement charge across domain walls at a scan frequency of 10 Hz.

Figure 7:
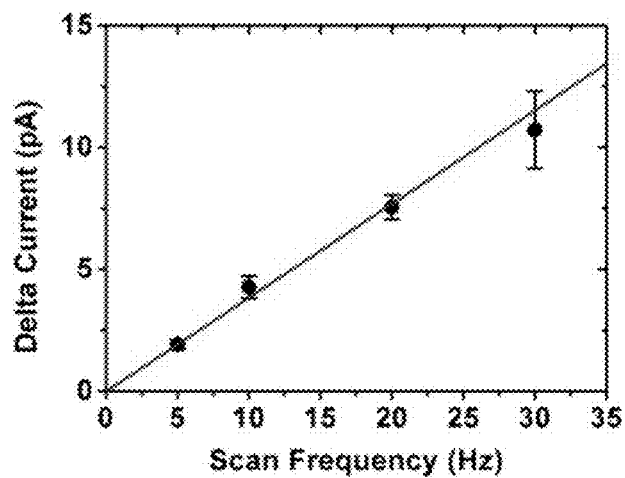
FIG. 7 illustrates current as a function of scan frequency in accordance with an embodiment.

At least some embodiments allow for measurement of the delta current, which is defined to be the difference between the maximum and minimum currents (shown, for example, in FIG. 3), as a function of scan frequency from 5 Hz to 30 Hz. FIG. 7 shows the delta current as a function of scan frequency. Following plotting of the delta current in the line profiles as a function of scan frequency from 5 Hz to 30 Hz, ten delta current values may be averaged in each data point, for example. As shown in FIG. 7, a linear relationship may be observed between the delta current and the scan frequency. As the displacement current linearly scales with the tip velocity, the methods of at least some embodiments are thus well-suited for high-speed measurement. The mechanical resonance frequency of the equipment being used, however, may represent a constraint on measurement speed.

Figure 10:
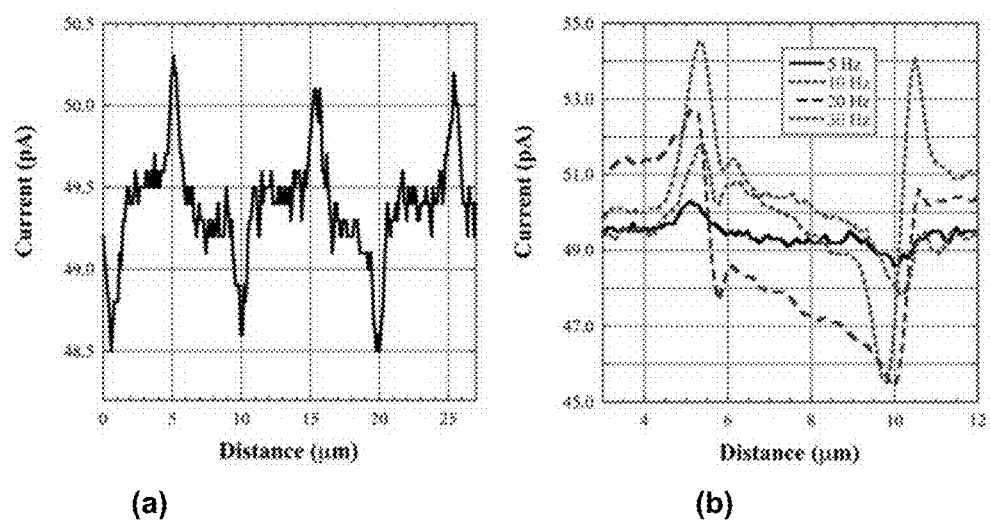
FIGS. 10(a)-(b) depict line profiles according to an embodiment.

FIG. 10 depicts the line profiles of the signal with (a) a 5 Hz scan frequency and (b) across 5 Hz-30 Hz scan frequencies. FIG. 10 indicates that above frequencies of 10 Hz, the displacement current linearly increases. The signals themselves change the line profiles due to the removal of surface charges and due to the aforementioned screen charge supply mechanisms. For the line profiles of FIGS. 10(a)-(b), the line was taken across domain boundaries in FIG. 3 in a direction perpendicular to the domain boundaries.

Some of the aforementioned embodiments were subjected to various experiments. For example, samples were imaged according to certain embodiments eight times at a scan frequency of 10 Hz. The experimentation indicated that after the first two consecutive scans, there was no significant change in the shape of the current profile. The difference between the first two scans and the rest of the remaining six scans may be attributable to the signal from the domain itself. For example, in some circumstances, the current on the domain increased and saturated by 0.5 pA in FIG. 3(d). Such a result may be consistent with the surface potential evolution as a function of number of scans using a grounded tip on pre-written domains.

In some embodiments, imaging may be based on the existence of internal screening charges. Such internal screening charges may be associated with oxygen vacancies, for example. In some instances, where internal screening charges are used in imaging, it may be expected that no contrast would show over the domains and domain boundaries based on charge gradient microscopy. For carrying out imaging based on internal screening charges, certain embodiments may involve techniques including heat treatment of a material sample above 200° C. and placement of the sample under vacuum conditions.

Figure 11:
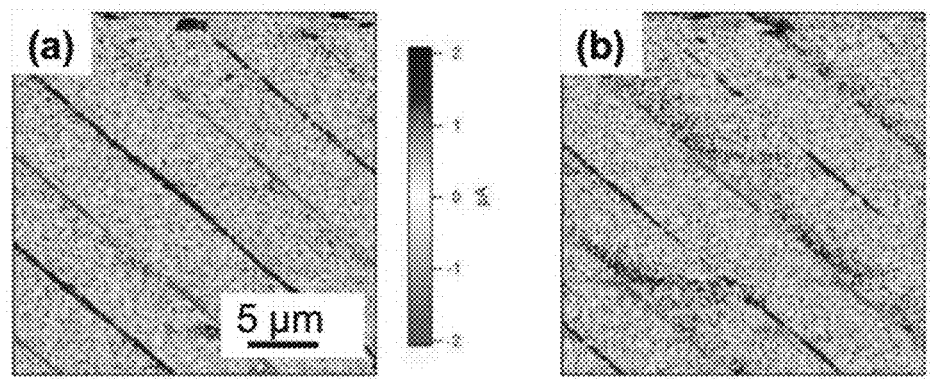
FIGS. 11(a)-(b) illustrate images obtained from using a probing mechanism having a doped Si tip, according to an embodiment.

In some embodiments, samples may be scanned at a scan rate of 5 Hz, the tip may be subjected to an applied load of 30 nN. The tips of certain embodiments are made of platinum, as were the tips used in the devices used to produce the images shown in FIGS. 3 and 7. However, at least some embodiments include tips made of other suitable materials, or any combination of suitable materials. For example, at least some embodiments include conducting diamond coated tips or doped Si tips. FIG. 11 illustrates imaging for a PPLN sample with (a) trace and (b) retrace scans at a frequency of 20 Hz taken with a doped Si tip. Greater variations may be present inside the domain centers as compared to platinum or conducting diamond coated tips.

Figure 8:
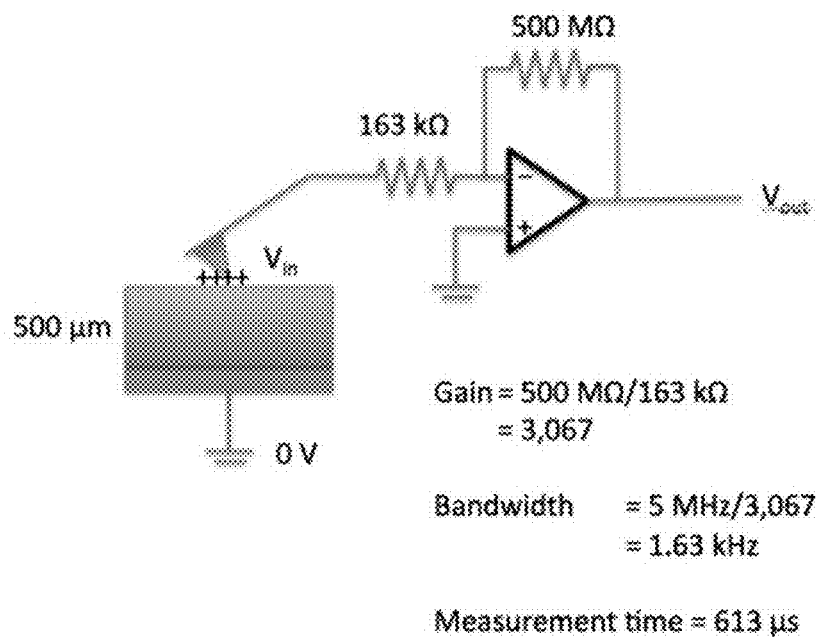
FIG. 8 is a schematic diagram of a device according to an embodiment.

In at least some embodiments, imaging may be carried out using a configuration shown in FIG. 8. In such a configuration, the tip to current amplifier resistance is about 163 kΩ, whereas the resistance over the current amplifier is 500 MO. The gain is 3,067 and the resulting bandwidth is 1.63 kHz. The gain-bandwidth product is approximately 5 MHz. In such a configuration, the bottom electrode is held at ground and the voltage source is provided on the surface by the combination of polarization and screen charges. The aforementioned values are merely representative of one possible configuration, and other configurations of circuitry may be used to implement the embodiments described herein.

The high-speed capabilities and ready collection of displacement current of some embodiments were observed in further experiments. In certain experiments, a conducting diamond tip (CDT-NCHR-10, 73 N/m, made by Nanosensors, Inc.) was used with a tip load of 41.4 μN, and scan frequency was increased to 78.12 Hz over a 10 μm×10 μm area on a PPLN sample while collecting both trace images (from left to right) and retrace images (from right to left). In some experiments, the scan angle was fixed at 90° in order to maximize the charge gradient across the domain boundaries.

Figure 9:
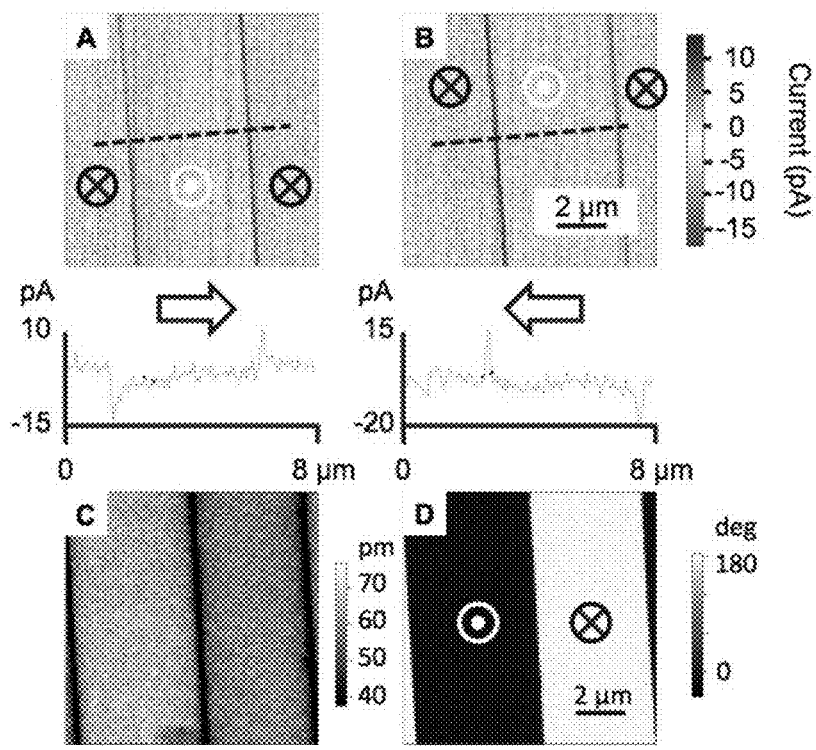
FIGS. 9(a)-(d) illustrate trace and retrace CGM images, and PFM amplitude and phase images.

FIG. 9 depicts (a) trace and (b) retrace images at a scan frequency of 78 Hz, according to an embodiment. The images were taken on domain boundaries of a PPLN sample, with (a) being taken from a left to right scan (hence, a trace scan) and (b) from right to left scan (thus being a retrace scan). The line profiles of FIG. 9 show the current peaks at domain boundaries. In addition, FIG. 9 depicts (c) PFM amplitude and (d) PFM phase images taken at the same region where a dark phase contrast corresponds to a positive (upward) domain and a bright phase contrast corresponds to negative (downward) domain. As appreciated from FIGS. 9(a) and (b), the current peaks are located at the domain walls, with a positive peak corresponding to the tip moving from the positive (upward) domain (shown in a dark violet color) to a negative (downward) domain (shown in a bright yellow color). The negative peak corresponds to the tip moving from the negative to the positive domain, as indicated by FIG. 4.

Figure 12:
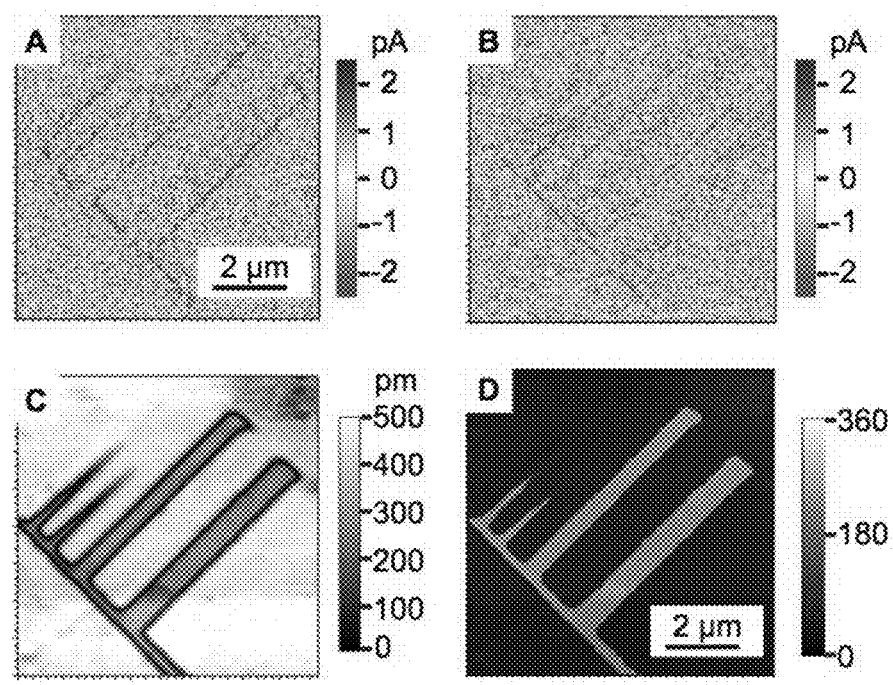
FIGS. 12(a)-(d) illustrate trace and retrace images at scan frequency of 78 Hz, according to an embodiment.

Furthermore, in some embodiments, the feature size of artificially switched domains in CLT thin films may be decreased to determine a spatial resolution achieved for the imaging. FIG. 12 depicts (a) trace and (b) retrace images of artificially decorated domains with different sizes, according to an embodiment. More particularly, the (a) trace and (b) retrace images were taken on ribbon shaped domains poled by 6 V to the bottom electrode of 85 nm thick $LiTaO_3$ films using platinum tips at a scan frequency of 40 Hz. As with FIG. 9, the (a) trace image corresponds to a left to right scan, while the (b) retrace images corresponds to a right to left scan. FIG. 12 also depicts (c) PFM amplitude and (d) PFM phase images are taken at the same region at scan frequency of 1 Hz, where a bright phase contrast corresponds to a positive (upward) domain and a dark phase contrast corresponds to a negative (downward) domain.

As seen in FIG. 12, at least some embodiments allow for visibility of features down to about 200 nm. Such a resolution is comparable to the domain wall width measured in FIG. 9. In comparison to a PFM resolution of about 10 nm, this relatively large value may indicate that the tip should be improved for the nanometer scale measurement of domains. In particular, the spatial resolution may be improved so as to be down to approximately 20 nm using a tip that separates the functions of scraping the screen charge and detecting the current flow. The fundamental limit may be determined based on at least one of the bandwidth of current amplifier, the contact area of the tip, and the sample surface or the domain wall thickness. Certain tip geometries and process parameters may be varied so as to improve spatial resolution.

In at least some embodiments, no significant milling effect was observed by mechanical indentation on the PPLN sample when using a platinum wire tip. However, such an effect may result from using a conducting diamond coated tip with a load over 40 pN. In light of the EFM images obtained before and after the aforementioned experiments, as described above in reference to FIG. 2, at least some embodiments may allow for mechanical scraping of the screening charges by the AFM tip. Thus, such embodiments allow for fast scanning probe microscopy that can characterize polarization domains by scraping the screen charges on the surface using a conducting nanoscale tip. Such embodiments therefore allow for investigation of unscreened surfaces without the need for ultra-high vacuum systems, among other benefits. Such embodiments may also allow for construction of devices that employ charge scraping and collection.

Figure 13:
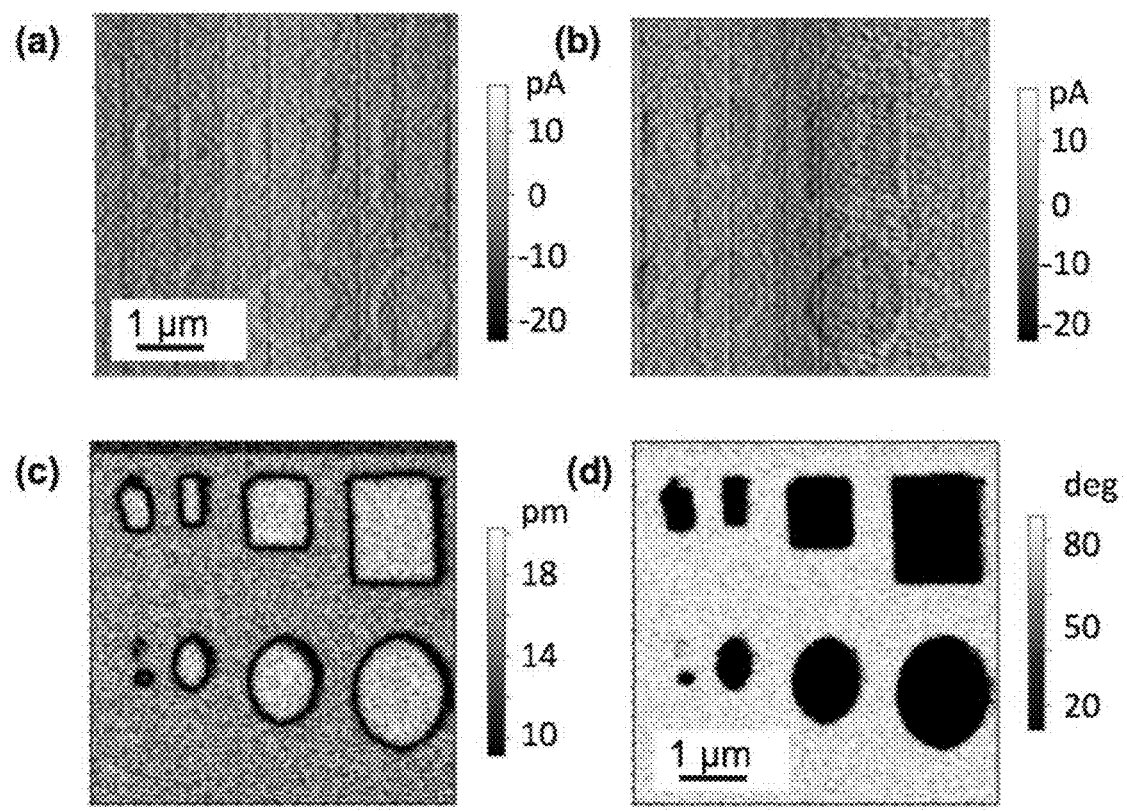
FIGS. 13(a)-(d) depict rapid imaging with trace and retrace scans, according to an embodiment.

As mentioned above, at least some embodiments were subjected to experimentation involving other ferroelectric materials, including very thin and uniform CLT thin films with thicknesses of 30-100 nm on 500 nm thick Cr electrodes. For imaging on CLT thin films, platinum wire tips were employed. The scan frequency was 39.06 Hz and the scan size was 8 μm×8 μm. The scan angle was fixed at 45°. The load applied to the tip was 1.17 μN. Both trace (from left to right) and retrace (from right to left) scans were imaged. Images of artificially decorated squares and circles with different sizes at a scan frequency of 156 Hz were also obtained, as shown in FIG. 13.

Images produced according to certain embodiments were compared to images obtained from PFM imaging of PPLN single crystal and CLT thin film samples. Conventional out-of-plane PFM was performed on the PPLN sample using a drive frequency of 426.54 kHz and a drive voltage of 1 V to the platinum wire tip. For CLT thin films, PFM images were obtained, as shown in FIG. 5, using a conducting diamond coated silicon cantilever with an AC bias voltage of 2 V and 70 kHz to the bottom electrode, a scan frequency of 2 Hz and an applied force of 2.3 μN. Further, the scan times achievable by at least some embodiments may allow for a domain image to be taken in 2-3 seconds, whereas standard PFM techniques often require several images for a single scan.

Figure 14:
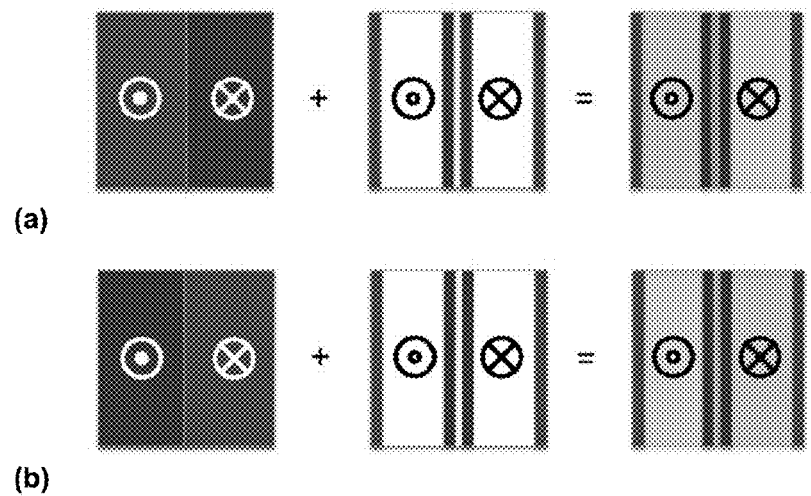
FIGS. 14(a)-(b) depict images according to alternative embodiments.

Some embodiments may combine various techniques for imaging ferroelectric materials and piezoelectric domain walls. In particular, the embodiment shown in FIG. 14 incorporates (and is not confined to) external screening of charges, transferring of neighboring screen charges, and refilling of charges from an ambient source. A projected image according to this embodiment is shown in FIG. 14(a), and may be analogous to the image shown in FIG. 3(b). By further way of example, another embodiment requires (but is not limited to) external screening of charges, transferring of neighboring screen charges, and refilling from the grounded AFM tip. A projected image according to such an embodiment is shown in FIG. 14(b) and is comparable to FIG. 3(c).

At least some embodiments may be readily implemented into scanning probe microscopes. Various implementations may allow for easier and faster imaging of domain walls for numerous types of samples. For example, lithium ion batteries may be better understood so as to improve various thin film battery applications. Carrying out imaging in accordance with the aforementioned embodiments may allow for enhanced understanding of lithium ion battery characteristics.

Some embodiments are devices including a data acquisition unit and a control unit integrated into a standalone system. In other devices, each of the data acquisition and the control unit may be connected for operation and utilization in conjunction with a plurality of apparatuses. Such apparatuses can include computers, diagnostic equipment, power sources, and monitors. In some embodiments, the data acquisition and the control unit may provide information to at least one apparatus that is not physically connected to either the data acquisition unit or the control unit. In some embodiments, at least one of the data acquisition unit and the control unit may be a handheld device or may be operably connected to a handheld device.

Figure 15:
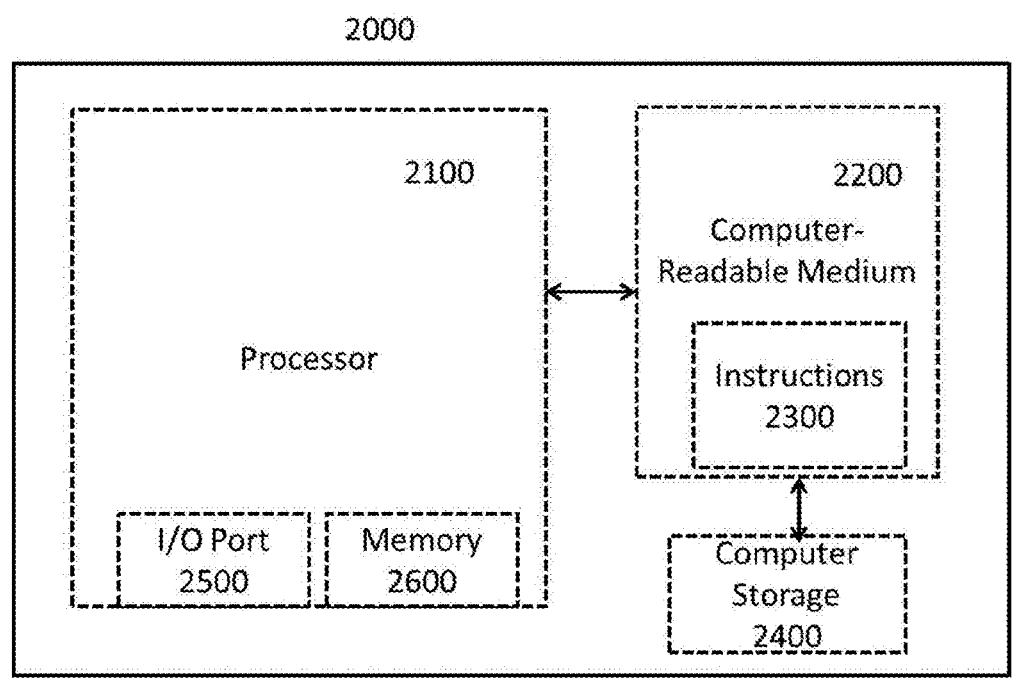
FIG. 15 illustrates a computer system for use with certain implementations.

As shown in FIG. 15, a system 2000 may implement the aforementioned methods of certain embodiments. The system 2000 may include a computer-accessible medium 2200 (e.g., as described herein, a storage device such as a hard disk, floppy disk, memory stick, CD-ROM, RAM, ROM, etc., or a collection thereof) in communication with a processing arrangement 2100. The computer-accessible medium 2200 may be a non-transitory computer-accessible medium. The computer-accessible medium 2200 can contain executable instructions 2300 thereon. In addition or alternatively, a storage arrangement 2400 can be provided separately from the computer-accessible medium 2200, which can provide the instructions to the processing arrangement 2100 so as to configure the processing arrangement to execute certain exemplary procedures, processes and methods, as described herein, for example. In at least one embodiment, the system 2000 is configured to communicate with microscope apparatuses including cantilever and probe devices and configurations.

System 2000 may also include a display or output device, an input device such as a key-board, mouse, touch screen or other input device, and may be connected to additional systems via a logical network. Many of the embodiments described herein may be practiced in a networked environment using logical connections to one or more remote computers having processors. Logical connections may include a local area network (LAN) and a wide area network (WAN) that are presented here by way of example and not by limitation. Such networking environments are commonplace in office-wide or enterprise-wide computer networks, intranets and the Internet and may use a wide variety of different communication protocols. Those skilled in the art can appreciate that such network computing environments can typically encompass many types of computer system configurations, including personal computers, hand-held devices, multi-processor systems, microprocessor-based or programmable consumer electronics, network PCs, minicomputers, mainframe computers, and the like. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

Various embodiments are described in the general context of method steps, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software and web implementations of the present invention could be accomplished with standard programming techniques with rule based logic and other logic to accomplish various steps. It should also be noted that the words "component" and "module," as may be used herein, are intended to encompass implementations using one or more lines of software code, and/or hardware implementations, and/or equipment for receiving manual inputs.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations may be depicted in a particular order, this should not be understood as requiring that such operations be performed in the particular order shown or in sequential order, or that all operations be performed, to achieve desirable results. Moreover, the separation of various aspects of the implementations described above should not be understood as requiring such separation in all implementations, and it should be understood that the described methods can generally be integrated in a single application or integrated across multiple applications.

Thus, particular implementations of the invention have been described. Other implementations are within the scope of the following claims. In some cases, actions recited in the claims may be performed in a different order and still achieve desirable results. In addition, the depictions in the accompanying figures do not necessarily require a particular order or sequential order.

What is claimed is:

1. A method for rapid imaging of a material specimen, the method comprising:
    positioning a tip to contact the material specimen;
    applying a force to a surface of the material specimen via the tip;
    moving the tip across the surface of the material specimen while removing or depositing electrical charge therefrom;
    generating a signal produced by contact between the tip and the surface;
    detecting, based on data from the signal, the removed electrical charge induced through the tip during movement of the tip across the surface, and
    measuring the detected electrical charge,
    wherein removing the electrical charge from the surface of the material specimen comprises scraping the material specimen while moving the tip across the surface.

2. The method of claim 1, wherein moving the tip comprises scanning the material specimen at a scan frequency between 5-30 Hz.

3. The method of claim 1, wherein the electrical charge comprises at least one of a displacement element, a piezoelectric charge flow element, and a relocated element.

4. The method of claim 1, wherein the tip comprises a coating of at least one of platinum or diamond.

5. The method of claim 1, wherein the material specimen is a ferroelectric or piezoelectric material.

6. The method of claim 1, wherein the electrical charge is collected without application of an external bias.

7. The method of claim 1, wherein the electrical charge is removed without altering polarization charges in the material specimen.

8. A device for rapid imaging of a material specimen, the device comprising:
    an apparatus configured to store the material specimen;
    a probing mechanism comprising a tip configured to:
        come into contact with a surface of the specimen, generating a force thereon, and
        remove charges from the surface by movement of the tip across the surface by scraping the charges from the surface of the specimen, and
    a measurement unit configured to measure the removed charges,
    wherein the tip comprises a coating of at least one of platinum or diamond.

9. The device of claim 8, wherein the probing mechanism is configured to be operable at a scan frequency between 5-30 Hz.

10. The device of claim 8, wherein the material specimen is a ferroelectric or piezoelectric material.

11. The device of claim 8, wherein the measurement unit is configured to measure electric polarization beneath the surface of the material specimen.

12. The device of claim 8, wherein the charge is collected without application of an external bias.

13. The device of claim 8, wherein a difference between a maximum current and a minimum current correlates linearly to a frequency at which the material specimen is scanned.

14. The device of claim 8, wherein the tip is configured to impart a mechanical impression on the material specimen.

* * * * *